(12) United States Patent
Wu et al.

(10) Patent No.: US 10,684,689 B2
(45) Date of Patent: Jun. 16, 2020

(54) CROSS-PLATFORM DYNAMIC HAPTIC EFFECT DESIGN TOOL FOR AUGMENTED OR VIRTUAL REALITY ENVIRONMENTS

(71) Applicant: Immersion Corporation, San Jose, CA (US)

(72) Inventors: Liwen Wu, Montreal (CA); William S. Rihn, San Jose, CA (US)

(73) Assignee: Immersion Corporation, San Jose, CA (US)

( * ) Notice: Subject to any disclaimer, the term of this patent is extended or adjusted under 35 U.S.C. 154(b) by 140 days.

(21) Appl. No.: 15/958,988

(22) Filed: Apr. 20, 2018

(65) Prior Publication Data

US 2019/0324540 A1    Oct. 24, 2019

(51) Int. Cl.
*G06F 3/01*    (2006.01)
*G06F 3/0484*    (2013.01)

(52) U.S. Cl.
CPC .......... *G06F 3/016* (2013.01); *G06F 3/04847* (2013.01)

(58) Field of Classification Search
CPC .............................. G06F 3/016; G06F 3/04847
See application file for complete search history.

(56) References Cited

U.S. PATENT DOCUMENTS

| 8,098,235 | B2 | 1/2012 | Heubel et al. |
| 8,947,216 | B2 | 2/2015 | Da Costa et al. |
| 9,898,084 | B2 | 2/2018 | Da Costa et al. |
| 10,102,723 | B2 | 10/2018 | Wu |
| 2011/0133910 | A1 | 6/2011 | Alarcon |
| 2014/0062682 | A1* | 3/2014 | Birnbaum ................ G08B 6/00 340/407.2 |
| 2014/0347176 | A1* | 11/2014 | Modarres ................ G06F 3/016 340/407.1 |
| 2015/0070269 | A1* | 3/2015 | Bhatia ..................... G06F 3/016 345/156 |
| 2015/0199024 | A1 | 7/2015 | Birnbaum et al. |
| 2015/0323994 | A1 | 11/2015 | Stahlberg et al. |
| 2016/0147333 | A1* | 5/2016 | Levesque .............. G06F 3/0487 345/161 |
| 2016/0179198 | A1* | 6/2016 | Levesque ................ G06F 3/016 340/407.1 |
| 2016/0189493 | A1* | 6/2016 | Rihn ........................ G08B 6/00 340/407.1 |
| 2018/0011538 | A1 | 1/2018 | Rihn et al. |

OTHER PUBLICATIONS

EP 19170277.8, "Extended European Search Report," dated Aug. 21, 2019, 10 pages.

* cited by examiner

*Primary Examiner* — Tadesse Hailu
(74) *Attorney, Agent, or Firm* — Kilpatrick Townsend & Stockton LLP (57) ABSTRACT

One illustrative system disclosed herein includes a computing device that comprises a memory and a processor in communication with the memory. The processor generates an interactive user interface and obtains an input parameter and a haptic parameter via the interactive user interface. The processor maps the input parameter to the haptic parameter using a mapping algorithm and designs a dynamic haptic effect based at least in part on mapping the input parameter to the haptic parameter. The processor can then generate a plurality of dynamic haptic effects for a plurality of user devices based at least in part on the designed dynamic haptic effect.

20 Claims, 7 Drawing Sheets

CROSS-PLATFORM DYNAMIC HAPTIC EFFECT DESIGN TOOL FOR AUGMENTED OR VIRTUAL REALITY ENVIRONMENTS

FIELD OF INVENTION

The present disclosure relates generally to user interface devices. More specifically, but not by way of limitation, this disclosure relates to tools for designing cross-platform dynamic haptic effects for augmented or virtual reality environments.

BACKGROUND

Augmented reality ("AR") devices provide an augmented reality environment in which physical objects or "real world" objects are concurrently displayed with virtual objects in a virtual space. Similarly, virtual reality ("VR") devices can be used to create a VR environment that can simulate a user's physical presence in the VR environment. A user of the AR or VR device can view the AR or VR environment and look at, or interact with, virtual objects in the AR or VR environment. Some AR or VR devices, however, may lack haptic feedback capabilities. Moreover, some AR or VR devices may not provide dynamic haptic feedback or playback (e.g., one or more haptic effects that change over time as the user interacts with the AR or VR environment). Furthermore, conventional systems and methods for developing or designing haptic effects may be limited to designing static haptic effects (e.g., a predetermined haptic effect) and may not allow the design of dynamic haptic effects. Moreover, conventional systems and methods for developing or designing haptic effects for AR or VR environments may limit a user to designing a haptic effect for only a particular device (e.g., a mobile phone) and therefore haptic effects designed using such conventional systems and methods may not be suitable for other devices (e.g., a wearable device).

SUMMARY

Various embodiments of the present disclosure provide systems and methods for designing cross-platform dynamic haptics for augmented or virtual reality environments.

In one embodiment, a system comprises a computing device comprising a processing device and a and a non-transitory computer-readable medium communicatively coupled to the processing device. The processing device is configured to perform operations comprising generating an interactive user interface for obtaining data for designing dynamic haptic effects for a simulated reality environment. The processing device is further configured to obtain data indicating an input parameter associated with the simulated reality environment or user interaction with the simulated reality environment via the interactive user interface. The processing device is further configured to obtain data indicating a haptic parameter via the interactive user interface. The processing device is further configured to map the input parameter to the haptic parameter using a mapping algorithm. The processing device is further configured to design a dynamic haptic effect based at least in part on mapping the input parameter to the haptic parameter. The processing device is further configured to generate a plurality of dynamic haptic effects for a plurality of user devices based at least in part on the designed dynamic haptic effect.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Reference now will be made in detail to various and alternative illustrative embodiments and to the accompanying drawings. Each example is provided by way of explanation and not as a limitation. It will be apparent to those skilled in the art that modifications and variations can be made. For instance, features illustrated or described as part of one embodiment may be used in another embodiment to yield a still further embodiment. Thus, it is intended that this disclosure includes modifications and variations that come within the scope of the appended claims and their equivalents.

Illustrative Examples of Tools for Designing Cross-Platform Dynamic Haptics for Augmented or Virtual Reality Environments One illustrative embodiment of the present disclosure comprises a computing device that includes a memory, a display, and a processor in communication with each of these elements. In some examples, the processor can automatically design or generate cross-platform dynamic haptic effects for a simulated reality environment (e.g., an augmented or virtual reality environment) based on received or obtained data (e.g., data received via user input). In some examples, a dynamic haptic effect can include one or more haptic effects that can change or vary based on data captured about the simulated reality environment or a user's interaction with the simulated reality environment. In some examples, designing or generating a cross-platform dynamic haptic effect includes generating or designing, based on a first designed or generated dynamic haptic effect, one or more other dynamic haptic effects that are suitable for various user devices.

For example, the processor of the computing device can generate one or more interactive user interfaces via which the processor can receive data (e.g., via user input) to design (e.g., generate) a dynamic haptic effect for a simulated reality environment. For instance, the processor can generate an interactive user interface via which the processor can receive user input indicating one or more input parameters associated with a simulated reality environment or a user's interaction with the simulated reality environment (e.g., a velocity of a virtual object in the simulated reality environment). The processor can also receive user input indicating a range of values for an input parameter. As an example, the processor receives user input indicating that a range for a velocity of a virtual object is between zero miles per hour and sixty miles per hour. In this example, the processor can also receive user input indicating one or more haptic parameters of a dynamic haptic effect that can be associated with (e.g., mapped to) the input parameters. In some examples, a haptic parameter is a characteristic of a dynamic haptic effect (e.g., a magnitude, duration, location, type, pitch, frequency, spacing between one or more haptic effects, wave shape, parameters of a periodic haptic effect, etc.) that can be mapped to (e.g., correlated with) one or more input parameters or vice versa. In this example, the processor can also receive user input indicating one or more values of a haptic parameter that correspond to one or more values of an input parameter. As an example, the processor receives user input indicating that a velocity of zero miles per hour of the virtual object corresponds to zero percent of a maximum magnitude of a dynamic haptic effect and a velocity of sixty miles per hour corresponds to one-hundred percent of the maximum magnitude of the dynamic haptic effect.

Continuing with this example, the processor can apply one or more mapping algorithms to the input parameters and the haptic parameters to map the input parameters to the haptic parameters (e.g., determine an association or relationship between an input parameter and a haptic parameter). For instance, the processor can receive data indicating that a mapping algorithm, such as, for example, a linear model, can be applied to an input parameter that is a velocity of an object in the simulated reality environment and an haptic parameter that is a magnitude of a dynamic haptic effect to map the input parameter to the haptic parameter. In this example, the processor can apply the linear model to the input parameter and the haptic parameter to determine a mapping or association between a value within the received range of values for the velocity of the virtual object (e.g., between zero miles per hour and sixty miles per hour) and the magnitude of the dynamic haptic effect (e.g., between zero percent of the magnitude of a dynamic haptic effect and one-hundred percent of the magnitude of the dynamic haptic effect). As an example, the processor can determine, based on the linear model, that the values for the velocity and the magnitude of the dynamic haptic effect have a mapping or relationship such that the magnitude of the dynamic haptic effect increases or decreases linearly with a value of the velocity. In this example, the processor can then automatically design one or more dynamic haptic effects based on mapping. For instance, the processor can design one or more dynamic haptic effects by interpolating various velocity values between zero and sixty miles per hour and corresponding magnitude values between zero and one-hundred percent and mapping a relationship between the various velocity values and corresponding magnitude values for dynamic haptic effects. In this example, one or more of the dynamic haptic effects can be output to a user (e.g., via a haptic output device of the user device) such that the user can perceive the magnitude of the dynamic haptic effects as increasing or decreasing linearly with the velocity of the virtual object as the user interacts with the simulated reality environment.

In the illustrative embodiment, the processor can analyze a designed dynamic haptic effect and generate one or more additional dynamic haptic effects that can be similar to the designed dynamic haptic effect and suitable for various devices. For instance, the processor can receive or obtain data (e.g., via user input or from another device) indicating that a designed dynamic haptic effect is intended for (e.g., suitable for) a particular user device or haptic output device. In this example, the processor can automatically convert the designed dynamic haptic effect to generate one or more dynamic haptic effects that can be similar to the designed dynamic haptic effect and suitable for various other user devices or haptic output devices.

As an example, the processor can receive data indicating that a designed dynamic haptic effect is suitable for a user device that includes a high definition haptic output device that supports a wide range of frequency values. In this example, processor can convert the designed dynamic haptic effect (e.g., by modifying one or more frequency values mapped to an input parameter) to generate one or more similar dynamic haptic effects that can be suitable for various user devices that include haptic output devices that support a narrower range of frequency values.

In some examples, the processor can apply one or more mapping algorithms to any input parameter and any haptic parameter individually or in combination to map various input parameters to various haptic parameters. For instance, the processor can apply a mapping algorithm to the velocity of an object in the simulated reality environment and a frequency of a dynamic haptic effect to map the velocity to the frequency. As another example, the processor can apply a mapping algorithm to the velocity of the object and a magnitude of a dynamic haptic effect to map the velocity to the magnitude. In still another example, the processor can apply a mapping algorithm to the velocity of the object and both of a magnitude and a frequency of a dynamic haptic effect to map the velocity to the magnitude and frequency of the dynamic haptic effect.

In this manner, systems and method described herein can design cross-platform dynamic haptic effects for simulated reality environments.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

Figure 1:
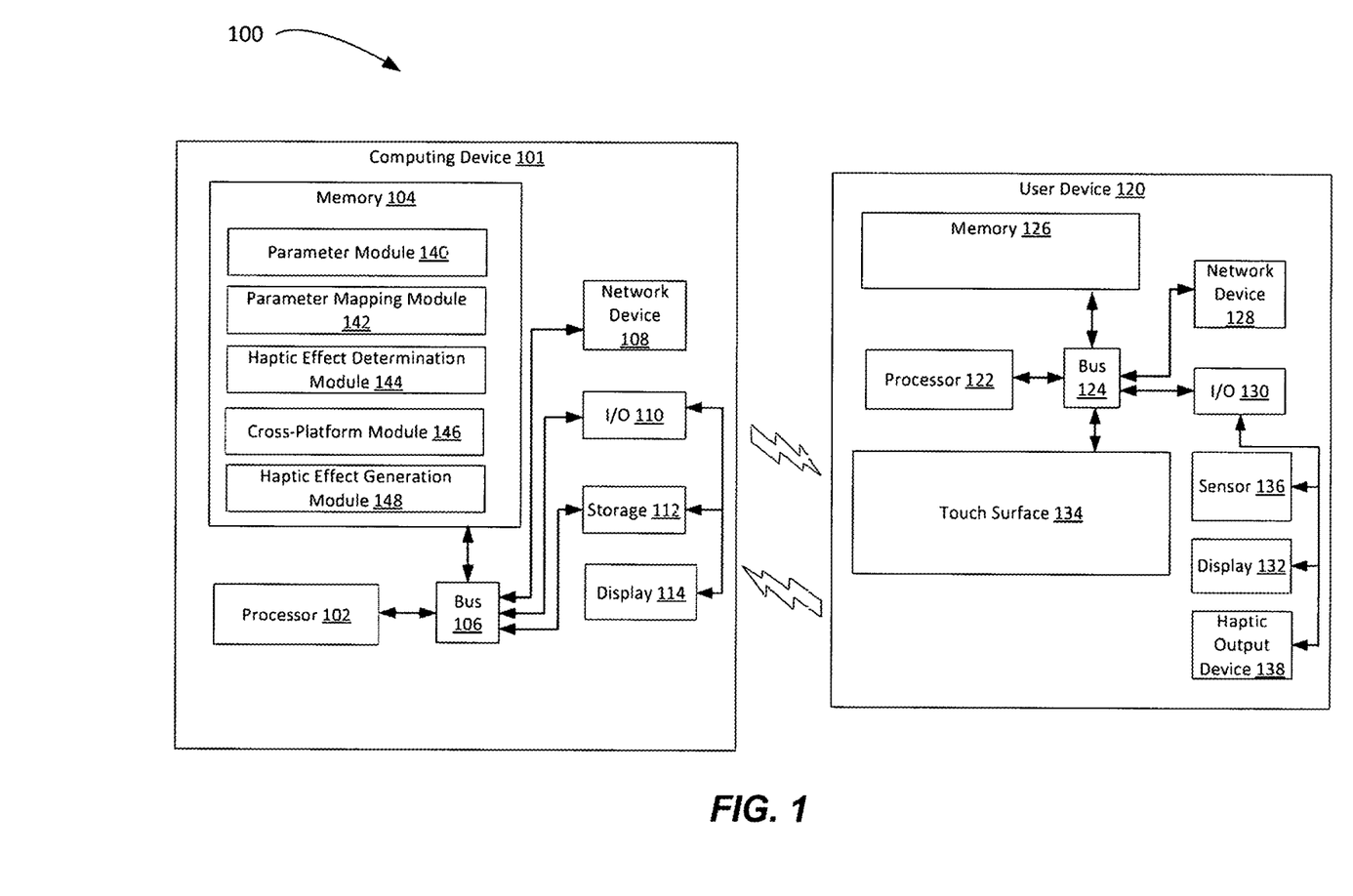
FIG. 1 is a block diagram showing a system for designing cross-platform dynamic haptics for augmented or virtual reality environments according to one embodiment.

Illustrative Examples of a System for Designing Cross-Platform Dynamic Haptics for Augmented or Virtual Reality Environments FIG. 1 is a block diagram showing a system 100 for designing cross-platform dynamic haptic effects for simulated reality environments (e.g., augmented or virtual reality environment), according to one embodiment. In the embodiment depicted in FIG. 1, the system 100 comprises a computing device 101 having a processor 102 in communication with other hardware via a bus 106. The computing device 101 may comprise, for example, a personal computer, a mobile device (e.g., a smartphone), tablet, etc. In some embodiments, the computing device 101 may include all or some of the components depicted in FIG. 1.

A memory 104, which can comprise any suitable tangible (and non-transitory) computer-readable medium such as random access memory ("RAM"), read-only memory ("ROM"), erasable and programmable read-only memory ("EEPROM"), or the like, embodies program components that configure operation of the computing device 101. In the embodiment shown, computing device 101 further includes one or more network interface devices 108, input/output (I/O) interface components 110, and storage 112.

Network interface device 108 can represent one or more of any components that facilitate a network connection. Examples include, but are not limited to, wired interfaces such as Ethernet, USB, IEEE 1394, and/or wireless interfaces such as IEEE 802.11, Bluetooth, or radio interfaces for accessing cellular telephone networks (e.g., transceiver/antenna for accessing a CDMA, GSM, UMTS, or other mobile communications network).

I/O components 110 may be used to facilitate wired or wireless connections to devices such as one or more displays 114, game controllers, keyboards, mice, joysticks, cameras, buttons, speakers, microphones and/or other hardware used to input or output data. Storage 112 represents nonvolatile storage such as magnetic, optical, or other storage media included in computing device 101 or coupled to the processor 102.

In some embodiments, the system 100 can include a user device 120 that can be, for example, a mobile device (e.g., a smartphone), tablet, e-reader, smartwatch, a head-mounted display, glasses, a wearable device, a handheld device (e.g., a video game controller), or any other type of user interface device. In some examples, the user device 120 can be any type of user interface device that can be used to interact with a simulated reality environment (e.g., an augmented or virtual reality environment).

The user device 120 can include a processor 122 in communication with other hardware via a bus 124. The user device 120 can also include a memory 126, network interface device 128, I/O components 130, and a display 132 each of which can be configured in substantially the same manner as the memory 104, network interface device 108, I/O components 110, and display 114, although they need not be.

In some embodiments, the user device 120 comprises a touch surface 134 (e.g., a touchpad or touch sensitive surface) that can be communicatively connected to the bus 124 and configured to sense tactile input of a user. While in this example, the user device 120 includes a touch surface 134 that is described as being configured to sense tactile input of a user, the present disclosure is not limited to such configurations. Rather, in other examples, the user device 120 can include the touch surface 134 and/or any surface that may not be configured to sense tactile input.

In some examples, the user device 120 comprises a touch-enabled display that combines the touch surface 134 and the display 132 of the user device 120. The touch surface 134 may be overlaid on the display 132, may be the display 132 exterior, or may be one or more layers of material above components of the display 132. In other embodiments, the user device 120 may display a graphical user interface ("GUI") that includes one or more virtual user interface components (e.g., buttons) on the touch-enabled display and the touch surface 134 can allow interaction with the virtual user interface components.

In some embodiments, the user device 120 comprises one or more sensors 136. In some embodiments, the sensor 136 may comprise, for example, gyroscope, an accelerometer, imaging sensor, a camera, microphone, force sensor, pressure sensor, and/or other sensor that can detect, monitor, or otherwise capture information about a user of the user device's interaction with a simulated reality environment (e.g., a virtual or augmented reality environment). For example, the sensor 136 can be any sensor that can capture information about the user's motion or the motion of the user device 120 as the user interacts with the simulated reality environment. As another example, the sensor 136 can be a pressure sensor that captures information about an amount of pressure of the user's contact with a virtual object in the simulated reality environment or a change in the amount of pressure of the user's contact.

The user device 120 further comprises a haptic output device 138 in communication with the processor 122. The haptic output device 138 is configured to output a haptic effect in response to a haptic signal. For example, the haptic output device 138 can output a haptic effect in response to a haptic signal from the processor 102 of the computing device 101. As another example, the processor 122 of the user device 120 can receive a haptic signal from the processor 102 of the computing device 101 and the processor 122 can transmit the haptic signal to the haptic output device 138. In some embodiments, the haptic output device 118 is configured to output a haptic effect comprising, for example, a vibration, a squeeze, a poke, a change in a perceived coefficient of friction, a simulated texture, a stroking sensation, an electro-tactile effect, a surface deformation (e.g., a deformation of a surface associated with the user device 120), and/or a puff of a solid, liquid, or gas. Further, some haptic effects may use multiple haptic output devices 138 of the same or different types in sequence and/or in concert.

Although a single haptic output device 138 is shown in FIG. 1, some embodiments may use multiple haptic output devices 138 of the same or different type to produce haptic effects. In some embodiments, the haptic output device 138 is internal to the user device 120 and in communication with the computing device 101 (e.g., via wired interfaces such as Ethernet, USB, IEEE 1394, and/or wireless interfaces such as IEEE 802.11, Bluetooth, or radio interfaces). For example, the haptic output device 138 may be associated with (e.g., coupled to or within) the user device 120 and configured to receive haptic signals from the processor 102 or the processor 122.

The haptic output device 138 may comprise, for example, one or more of a piezoelectric actuator, an electric motor, an electro-magnetic actuator, a voice coil, a shape memory alloy, an electro-active polymer, a solenoid, an eccentric rotating mass motor (ERM), a linear resonant actuator (LRA), a spinning or scalable rotary actuator (SRA), an ultrasonic actuator, a piezo-electric material, a deformation device, an electrostatic actuator, a shape memory material, which includes a metal, polymer, or composite, or a solenoid resonance actuator. In some embodiments, the haptic output device 138 comprises fluid configured for outputting a deformation haptic effect (e.g., for bending or deforming a surface associated with the user device 120). In some embodiments, the haptic output device 138 comprises a mechanical deformation device. For example, in some embodiments, the haptic output device 138 may comprise an actuator coupled to an arm that rotates a deformation component. The actuator may comprise a piezo-electric actuator, rotating/linear actuator, solenoid, an electroactive polymer actuator, macro fiber composite (MFC) actuator, shape memory alloy (SMA) actuator, and/or other actuator. As used herein, the term "MFC element" is used to refer to a component or element that acts as both an actuator and a sensor. In some examples, the term "MFC element" can be used to refer to a transducer that uses energy to output a haptic effect or receives energy as an input. For example, the MFC element can be used as a sensor when the MFC element is pressed, touched, bended, etc. In this example, when the MFC element is pressed, touched, bended, etc., one or more actuator leads or terminals of the MFC element can carry a voltage that can be detected, amplified, analyzed, etc. by a microcontroller.

Turning to memory 104 of the computing device 101, modules 140, 142, 144, 146, and 148 are depicted to show how a device can be configured in some embodiments for designing cross-platform dynamic haptic effects for simulated reality environments. In some embodiments, modules 140, 142, 144, 146, and 148 may comprise processor executable instructions that can configure the processor 102 to perform one or more operations.

For example, a parameter module 140 includes instructions that can be executed by the processor 102 to provide content (e.g., texts, images, sounds, videos, etc.) to a user (e.g., to a user of the computing device 101 or the user device 120).

As an example, the parameter module 140 can include instructions that, when executed by the processor 102, cause the processor 102 to generate and output (e.g., via the display 114) one or more interactive user interfaces via which the processor 102 can receive or obtain data (e.g., via user input) for designing a dynamic haptic effect for a simulated reality environment. For instance, the parameter module 140 can include instructions that, when executed by the processor 102, cause the processor 102 to generate an interactive user interface via which the processor 102 can receive data indicating one or more input parameters associated with a simulated reality environment or a user's interaction with the simulated reality environment. Examples of an input parameter include, but are not limited to, a path, velocity, acceleration, force, etc. of a virtual object in the simulated reality environment or of the user's interaction with the simulated reality environment (e.g., the user's motion or motion of the user device 120 as the user interacts with the simulated reality environment), an amount of pressure of the user's contact with a virtual object in the simulated reality environment, a simulated characteristic (e.g., texture, stiffness, etc.) of an object in the virtual environment, a virtual distance between objects in the simulated reality environment, or any other parameter associated with the simulated reality environment. In some embodiments, the processor 102 can receive data indicating a range of values for an input parameter via the interactive user interface. As an example, the processor 102 receives data indicating that a range of values for a velocity of a virtual object in the simulated reality environment is between zero miles per hour and one-hundred miles per hour. In some embodiments, input parameters or values of an input parameter (e.g., a range of values for the input parameter) can be determined or calculated by the processor 102 based on sensor data obtained or collected from a sensor configured to capture information about one or more input parameters. In still another example, the processor 102 can obtain values of an input parameter or a range of values for the input parameter from the memory 104, the storage 112 or other database, or other device.

In some embodiments, the processor 102 can receive, via the interactive user interface, data indicating one or more haptic parameters of a dynamic haptic effect that can be designed by the processor 102. In some embodiments, a haptic parameter is a characteristic of a dynamic haptic effect (e.g., a magnitude, duration, location, type, pitch, frequency, spacing between one or more haptic effects, wave shape, parameters of a periodic haptic effect, etc.) that can be mapped to (e.g., correlated with) one or more input parameters and vice versa. In some examples, the processor 102 can receive, via the interactive user interface, data indicating one or more values of a haptic parameter that correspond to one or more values of an input parameter. As an example, the processor 102 receives data indicating that a velocity of zero miles per hour of a virtual object in the simulated reality environment corresponds to zero percent of a maximum magnitude a dynamic haptic effect and a velocity of one-hundred miles per hour corresponds to one-hundred percent of the maximum magnitude of the dynamic haptic effect.

In some embodiments, a parameter mapping module 142 can include instructions that, when executed by the processor 102, cause the processor 102 to apply one or more mapping algorithms to received input parameters and haptic parameters to map the input parameters to the haptic parameters (e.g., determine an association or relationship between an input parameter and a haptic parameter). In some instances, the processor 102 can apply a mapping algorithm to an input parameter and a haptic parameter to define or determine how a haptic parameter can be modulated based on the input parameter. In some examples, the parameter mapping module 142 can include instructions that, when executed by the processor 102, cause the processor 102 to apply a mapping algorithm to any input parameter and any haptic parameter individually or in combination to map various input parameters to various haptic parameters. For instance, the processor 102 can apply a mapping algorithm to the velocity of an object in the simulated reality environment and a frequency of a dynamic haptic effect to map the velocity to the frequency. As another example, the processor 102 can apply a mapping algorithm to the velocity of the object and a magnitude of a dynamic haptic effect to map the velocity to the magnitude. In still another example, the processor 102 can apply a mapping algorithm to a velocity of the object and both of a magnitude and a frequency of a dynamic haptic effect to map the velocity to the magnitude and frequency of the dynamic haptic effect.

In some embodiments, the parameter mapping module 142 can include instructions that, when executed by the processor 102, cause the processor 102 to apply one or more mapping algorithms such as, for example, a linear model, an exponential model, a logarithmic model, a custom model (e.g., a model obtained by the processor 102 via user input, from a database, or other device), or any other suitable model, to an input parameter and a haptic parameter to map the input parameter to the haptic parameter.

For instance, the processor 102 can receive data indicating that a mapping algorithm, such as, for example, a linear model, can be applied to an input parameter that is a velocity of an object in the simulated reality environment and a haptic parameter that is a pitch (e.g., tonality or frequency) of a dynamic haptic effect to map the input parameter to the haptic parameter. In this example, the processor 102 can apply the linear model to the input parameter and the haptic parameter to determine a mapping or association between a value within a received range of values for the velocity of the object (e.g., a velocity value between zero miles power hour and one-hundred miles per hour) and the pitch of the dynamic haptic effect (e.g., between zero percent of the maximum pitch and one-hundred percent of the maximum pitch). As an example, the processor 102 can determine, based on the linear model, that the velocity values and the pitch values have a mapping or relationship such that a value of the pitch of the dynamic haptic effect increases or decreases linearly with a value of the velocity.

In some examples, the parameter mapping module 142 can include instructions that, when executed by the processor 102, cause the processor 102 to automatically design one or more dynamic haptic effects based on the determined mapping. For instance, the processor 102 can design one or more dynamic haptic effects by interpolating various velocity values between zero and one-hundred miles per hour and corresponding pitch values between zero and one-hundred percent of the maximum pitch value and mapping a relationship between the various velocity values and corresponding pitch values for dynamic haptic effects. In this example, one or more of the dynamic haptic effects can be output to a user (e.g., via a haptic output device 138 of the user device 120) such that the user can perceive the pitch of the dynamic haptic effects as increasing or decreasing linearly with the velocity of the virtual object as the user interacts with the simulated reality environment.

As another example, the processor 102 can receive data indicating that a mapping algorithm, such as, for example, a linear model or a different mapping algorithm, can be applied to the velocity of an object in the simulated reality environment and a haptic parameter that is a frequency of the dynamic haptic effect to map velocity to the frequency. In this example, the processor 102 can apply the mapping algorithm to the velocity and the frequency to determine a mapping or association between a value within a received range of values for the velocity of the object (e.g., a velocity value between zero miles power hour and one-hundred miles per hour) and the frequency of the dynamic haptic effect (e.g., between zero percent of the maximum frequency and one-hundred percent of the maximum frequency) in substantially the same manner as described above.

In some instances, the parameter mapping module 142 can include instructions that, when executed by the processor 102, cause the processor 102 to map one or more subsets of values within a received range of values for an input parameter to a haptic parameter using one or more mapping algorithms.

For instance, the processor 102 can receive data indicating that a range of values for a velocity of a virtual object in the simulated reality environment is between zero miles per hour and one-hundred miles per hour. The processor 102 can receive data indicating that a first subset of velocity values is between zero miles per hour and sixty miles per hour and that the first subset of velocity values corresponds to a first haptic parameter range that is between zero percent and eighty percent of a maximum magnitude value of a dynamic haptic effect. In this example, the processor 102 can map the velocity values in the first subset of velocity values to the first haptic parameter range using any suitable mapping algorithm in substantially the same manner as described above. Continuing with this example, the processor 102 can receive data indicating that a second subset of velocity values is between sixty miles per hour and one-hundred miles per hour and that the second subset of velocity values correspond to a second haptic parameter range that is between eighty percent and one-hundred percent of the maximum magnitude of the dynamic haptic effect. In this example, the processor 102 can map the velocity values in the second subset of velocity values to the second haptic parameter range using any suitable mapping algorithm in substantially the same manner as described above.

In this example, processor 102 can use the same mapping algorithm or a different mapping algorithm to map the velocity values in the first subset of velocity values to the first haptic parameter range and map the velocity values in the second subset of velocity values to the second haptic parameter range. In some examples, the processor 102 can then generate or design one or more haptic effects based on the mapping in substantially the same manner as described above (e.g., by interpolating various velocity values within the first or second subset of velocity values and corresponding magnitude values for the dynamic haptic effect within the first or second haptic parameter range). As an example, the processor 102 can design one or more dynamic haptic effects by interpolating various velocity values between zero and sixty miles per hour and corresponding magnitude values between zero and eighty percent of the maximum magnitude value.

In this manner, the processor 102 can design or generate various dynamic haptic effects by mapping various haptic parameters to input parameters using various combinations of input parameters, haptic parameters, ranges of input parameters, ranges of haptic parameters, or mapping algorithms and using the mapped haptic parameters to design dynamic haptic effects.

In some embodiments, the haptic effect determination module 144 includes instructions that, when executed by the processor 102, cause the processor 102 to determine a dynamic haptic effect to generate. The haptic effect determination module 144 may include instructions that, when executed by the processor 102, cause the processor 102 to select one or more dynamic haptic effects to output using one or more algorithms or lookup tables. In some embodiments, the haptic effect determination module 144 comprises one or more algorithms or lookup tables that include data corresponding to various haptic effects and usable by the processor 102 to determine a dynamic haptic effect.

Particularly, in some embodiments, the haptic effect determination module 160 may include instructions that, when executed by the processor 102, cause the processor 102 to determine a dynamic haptic effect based at least in part on a simulated reality environment or a user's interaction with the simulated reality environment (e.g., sensor signals received by the processor 102 from the sensor 136 of the user device).

For example, the sensor 136 may detect a user's motion (e.g., a user that is holding or wearing the user device 120) or the user's motion of the user device 120 as the user interacts with the simulated reality environment and transmit a sensor signal to the processor 102. The processor 102 may receive the sensor signal and determine the motion of the user or the user device 120 and/or a characteristic of the motion of the user or the user device 120. The haptic effect determination module 160 may cause the processor 102 to determine an input parameter associated with the determined motion or characteristic of the motion. For instance, the processor 102 can determine that the user is moving the user device 120 at a particular velocity and determine that the velocity is a velocity input parameter of that particular velocity value. In this example, the processor 102 can determine a dynamic haptic effect based at least in part on the determined user motion, motion of the user device 120 and/or characteristic of the motion. For example, the parameter mapping module 142 can cause the processor 102 to apply a mapping algorithm to the velocity value to determine a haptic parameter associated with the velocity value in substantially the same manner as described above. In this example, the haptic effect determination module 160 can cause the processor 102 to determine a dynamic haptic effect that has the determined haptic parameter (e.g. a dynamic haptic effect having a magnitude corresponding to the velocity value).

As another example, the sensor 136 may capture information about an amount of pressure of the user's contact with a virtual object in the simulated reality environment or a change in the amount of pressure of the user's contact and transmit a sensor signal to the processor 102. The processor 102 may receive the sensor signal and determine the amount of pressure or change in pressure. The parameter mapping module 142 can cause the processor 102 to apply a mapping algorithm to the amount of pressure or change in pressure to determine a haptic parameter associated with the amount of pressure or change in pressure in substantially the same manner as described above. In this example, the haptic effect determination module 160 can cause the processor 102 to determine a dynamic haptic effect that has the determined haptic parameter (e.g. a dynamic haptic effect having a frequency and/or duration corresponding to the amount of pressure or change in pressure).

In some instances, the cross-platform module 146 can include instructions that, when executed by the processor 102, cause the processor 102 to analyze a designed dynamic haptic effect (e.g., analyze a haptic parameter of a dynamic haptic effect designed using the parameter mapping module 142) and generate one or more additional dynamic haptic effects that can be similar to the designed dynamic effect and suitable for various devices or platforms.

For instance, the processor 102 can receive or obtain data (e.g., via user input or from another device) indicating that a designed dynamic haptic effect (e.g., a dynamic haptic effect generated by the processor 102 executing instructions included in the parameter mapping module 142) is intended for (e.g., suitable for) a particular user device or haptic output device. In this example, the cross-platform module 146 can include instructions that, when executed by the processor 102, cause the processor 102 to automatically convert the designed dynamic haptic effect to generate one or more dynamic haptic effects that can be similar to the designed dynamic haptic effect and suitable for various other user devices or haptic output device.

As an example, processor 102 can receive data indicating that a designed dynamic haptic effect is suitable for a user device 120 that includes a high definition haptic output device 138 that supports a wide range of frequency values. In this example, the cross-platform module 146 can include instructions that, when executed by the processor 102, cause the processor 102 to automatically convert the designed haptic effect (e.g., by modifying one or more frequency values mapped to an input parameter) to generate one or more similar dynamic haptic effects that can be suitable for various user devices that include haptic output devices that support a narrower range of frequency values (e.g., a linear resonant actuator or a spinning or scalable rotary actuator).

As another example, the processor 102 can receive data indicating that a type or other characteristic of various user devices 120 (e.g., a type of a haptic output device 138 of the user device 120) via which a user can interact with a simulated reality environment.

In this example, the processor 102 can convert a designed dynamic haptic effect into one or more dynamic haptic effects based on the type or characteristic of the user device 120. As an example, the processor 102 design a dynamic haptic effect based on a mapping of a velocity of a virtual object to a frequency of a dynamic haptic effect. In this example, the processor 102 can receive data indicating the type of the user device 120 or the haptic output device 138 and the processor 102 can determine that the user device 120 is not capable of modifying or configuring a frequency of a dynamic haptic effect to be output via the haptic output device 138. In this example, the processor 102 can determine one or more other haptic parameters (e.g., magnitude) that can be mapped to the velocity of a virtual object to generate a dynamic haptic effect that corresponds to (e.g., is similar to) the originally designed dynamic haptic effect and is suitable for the user device 120 and haptic output device 138.

In some embodiments, the haptic effect generation module 148 represents programming that causes the processor 102 to generate and transmit haptic signals to a haptic output device (e.g., the haptic output device 138 of the user device 120 or another haptic output device) to generate a designed dynamic haptic effect. In some embodiments, the processor 102 can transmit haptic signals to the haptic output device to cause the haptic output device to generate a dynamic haptic effect designed or generated by the processor 102 executing instructions included in the parameter mapping module 142, haptic effect determination module 144, or the cross-platform module 146. In some examples, the haptic effect generation module 148 can include instructions that, when executed by the processor 102, cause the processor 102 to access stored waveforms or commands to send to the haptic output device to create the selected dynamic haptic effect. For example, the haptic effect generation module 148 may cause the processor 102 to access a lookup table that includes data indicating one or more haptic signals associated with one or more designed dynamic haptic effects and determine a waveform to transmit to the haptic output device to generate a particular dynamic haptic effect. In some embodiments, the haptic effect generation module 148 may comprise algorithms to determine the haptic signal. In some embodiments, the haptic effect generation module 148 may include instructions that, when executed by the processor 102, cause the processor 102 to determine target coordinates for the haptic effect (e.g., coordinates for a location at which to output the haptic effect). In some embodiments, the processor 102 can transmit a haptic signal to a haptic output device that includes one or more haptic output devices. In such embodiments, the haptic effect generation module 148 may cause the processor 102 to transmit haptic signals to the one or more haptic output devices to generate the selected dynamic haptic effect.

Although the exemplary system 100 of FIG. 1 is depicted as having a certain number of components, in other embodiments, the exemplary system 100 has any number of additional or alternative components. Furthermore, while in some examples described above, the processor 102 can map input parameters to haptic parameters based on received data that indicates a mapping algorithm to apply to the input parameters and haptic parameters, the present disclosure is no limited to such configurations. Rather, in other examples, the processor 102 can determine or predict a mapping algorithm to apply to the input parameters and haptic parameters (e.g., based on a range of values of an input parameter and one or more values of the corresponding haptic parameter) to map the input parameters to the haptic parameters.

Figure 2:
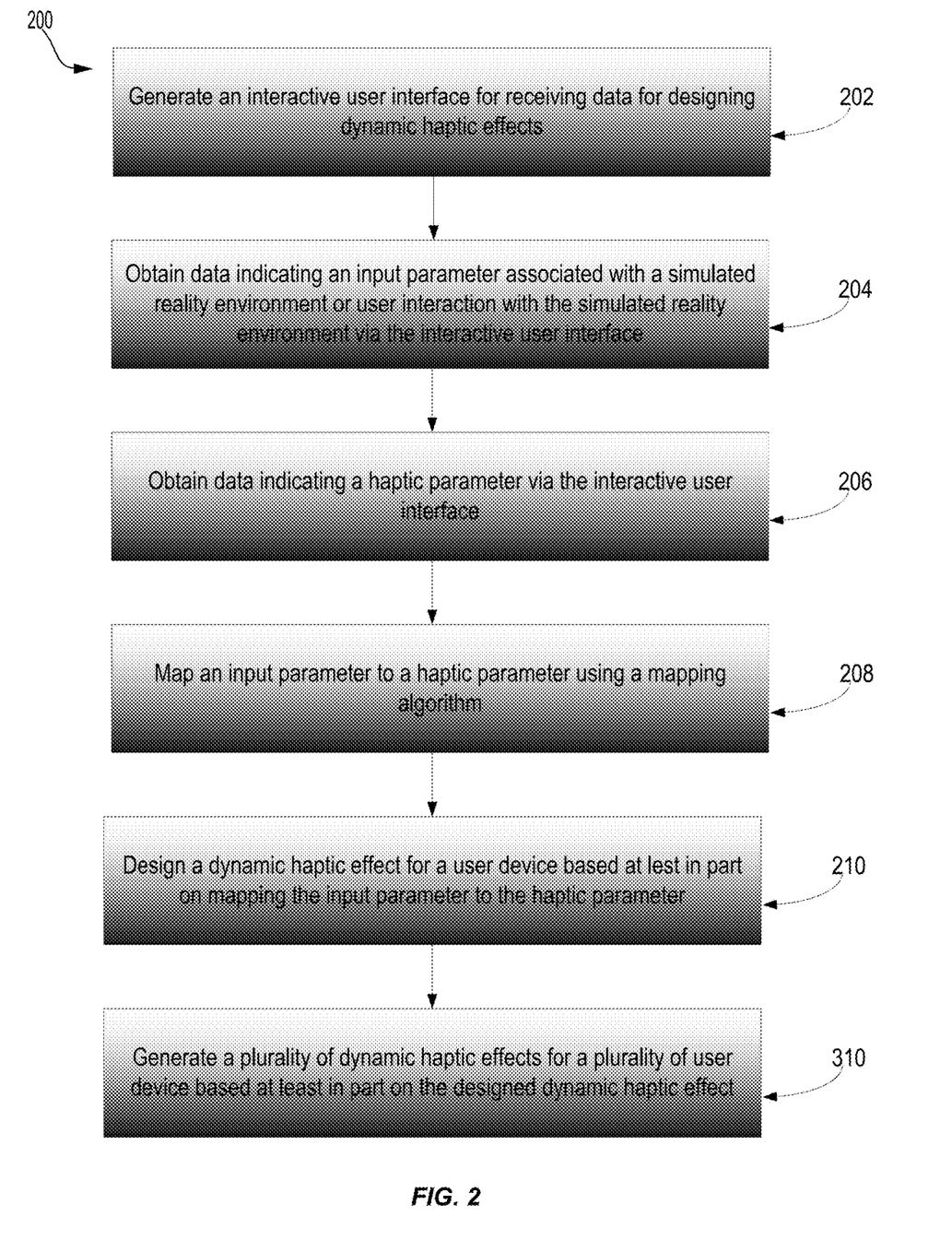
FIG. 2 is a flow chart of steps for performing a method for designing cross-platform dynamic haptics for augmented or virtual reality environments according to one embodiment.

Illustrative Methods for Designing Cross-Platform Dynamic Haptics for Augmented or Virtual Reality Environments FIG. 2 is a flow chart of steps for performing a method 200 for designing cross-platform dynamic haptics for augmented or virtual reality environments according to one embodiment. In some embodiments, the steps in FIG. 2 may be implemented in program code that is executable by a processor, for example, the processor in a general purpose computer, a mobile device, or a server. In some embodiments, these steps may be implemented by a group of processors. In some embodiments, one or more steps shown in FIG. 2 may be omitted or performed in a different order. Similarly, in some embodiments, additional steps not shown in FIG. 2 may also be performed. For illustrative purposes, the steps of the method 200 are described below with reference to components described above with regard to the system shown in FIG. 1, but other implementations are possible.

The method 200 begins at step 202 when an interactive user interface for obtaining or receiving data for designing dynamic haptic effects for a simulated reality environment is generated.

In some embodiments, a parameter module 140 of a computing device 101 causes a processor 102 of the computing device 101 to generate and output (e.g., via a display 114 of the computing device 101) one or more interactive user interfaces via which the processor 102 can receive or obtain data (e.g., via user input) for designing a dynamic haptic effect for a simulated reality environment.

The method 200 continues at step 204 when data indicating an input parameter associated with the simulated reality environment or user interaction with the simulated reality environment is obtained via the interactive user interface.

In some embodiments, the processor 102 can generate the interactive user interface (e.g., in step 202) via which the processor 102 can receive data (e.g., via user input) indicating one or more input parameters associated with a simulated reality environment or a user's interaction with the simulated reality environment. As an example, a simulated reality environment can include a simulated painting environment in which a user can interact with the environment using a virtual paint brush. In this example, an example of an input parameter that can be received by the processor 102 in step 204 can include, but is not limited to, a velocity with which a user can paint in the simulated reality environment (e.g., velocity of the virtual paint brush), a travel distance or path of the virtual paint brush, a size of the virtual paint brush, parameters associated with the user's motion (e.g., the user's movement or rotation of a head-mounted display), an amount of pressure of the user's contact with a virtual object in the simulated reality environment, a simulated characteristic (e.g., texture, stiffness, etc.) of an object in the virtual environment, a virtual distance between objects in the simulated reality environment, or any other parameter of the simulated reality environment or the user's interaction with the simulated reality environment. In some examples, in step 204, the processor 102 can receive, via the interactive user interface, data indicating a range of values for an input parameter. As an example, the processor 102 can receive data indicating that a range of values for a velocity of a virtual car in a simulated reality environment is between zero miles per hour and sixty miles per hour.

The method 200 continues at step 206 when data indicating a haptic parameter is obtained via the interactive user interface. In some embodiments, the processor 102 can receive, via the user interface, data indicating one or more one or more haptic parameters of a dynamic haptic effect that can be designed by the processor 102.

In some embodiments, a haptic parameter can be a parameter or characteristic of a periodic dynamic haptic effect (e.g., a dynamic haptic effect that can be generated based on a periodic waveform) including, for example, a shape of the waveform (e.g., sinusoidal waveform, square waveform, triangular waveform, square waveform, sawtooth waveform, etc.). In another example, a haptic parameter can be any characteristic of a dynamic haptic effect (e.g., a magnitude, duration, location, type, pitch, frequency, spacing between one or more haptic effects, wave shape, etc.) that can be mapped to (e.g., correlated with) one or more input parameters or vice versa.

In some examples, the processor 102 can receive, via the interactive user interface, indicating one or more values of a haptic parameter that correspond to one or more values of an input parameter. As an example, the processor 102 receives user input indicating that a velocity of zero miles per hour of a virtual car corresponds to zero percent of a maximum magnitude of a dynamic haptic effect and a velocity of sixty miles per hour corresponds to one-hundred percent of the maximum magnitude of the dynamic haptic effect.

Figure 3:
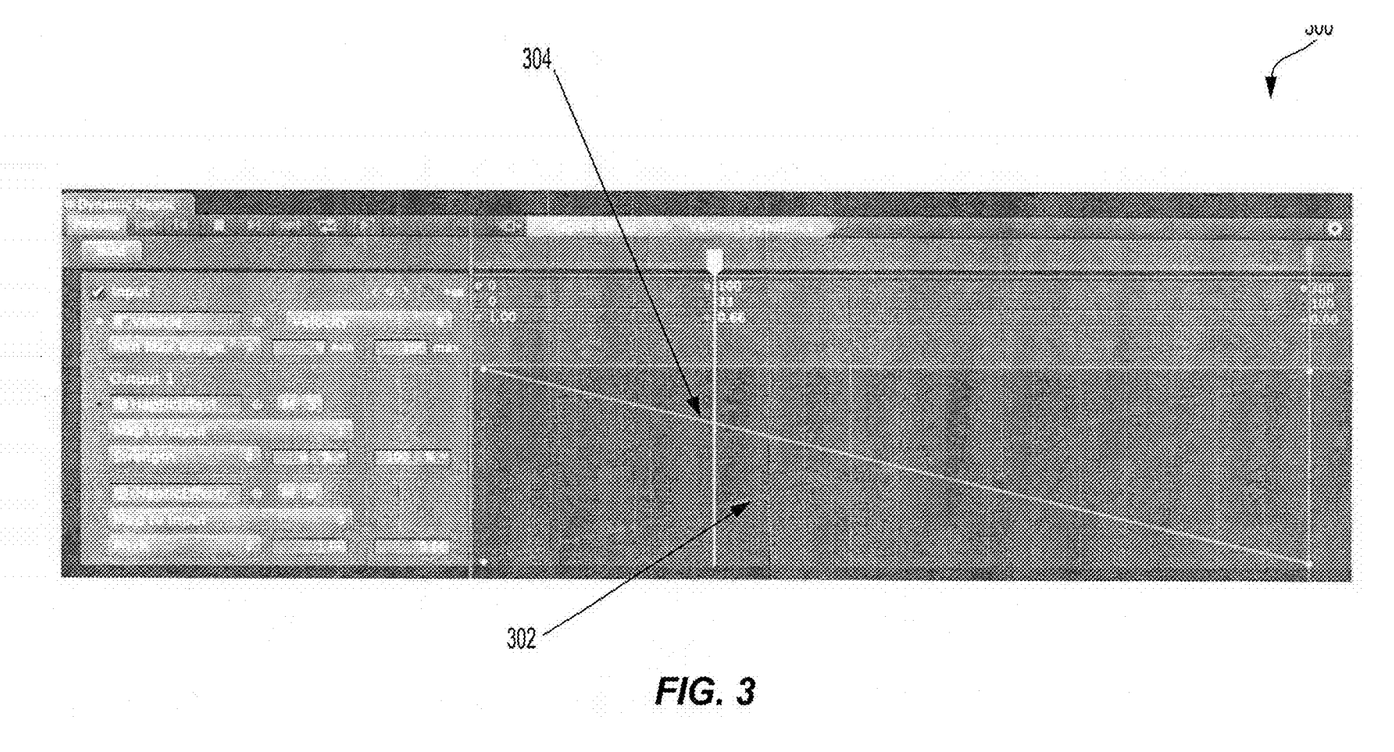
FIG. 3 is an example of an interactive user interface that can be generated for designing cross-platform dynamic haptics for augmented or virtual reality environments according to one embodiment.

For example, FIG. 3 is an example of an interactive user interface 300 that can be generated (e.g., in step 202 of FIG. 2) for designing cross-platform dynamic haptics for augmented or virtual reality environments according to one embodiment. In this example, a processor 102 of a computing device 101 of FIG. 1 can generate the interactive user interface 300 and display the interactive user interface 300 via a display (e.g., the display 114).

In the example depicted in FIG. 3, the processor 102 can receive, via the interactive user interface 300, data indicating that an input parameter includes a velocity of a virtual vehicle and the velocity can have a range between zero miles per hour and three-hundred miles per hour. In this example, the processor 102 can also receive data indicating that a first haptic parameter includes a strength (e.g., magnitude) of a dynamic haptic effect and a second haptic parameter includes a pitch (e.g., a tonality or other sound characteristic that can be based on frequency) of the dynamic haptic effect. In this example, processor 102 can receive data indicating that a velocity of zero miles per hour of the virtual vehicle corresponds to zero percent of a maximum strength of a dynamic haptic effect and a velocity of three-hundred miles per hour corresponds to one-hundred percent of the maximum strength of the dynamic haptic effect. In this example, the processor 102 can also receive data indicating that a velocity of zero miles per hour corresponds to a maximum value of the pitch of the dynamic haptic effect (e.g., a value of one) and a velocity of three-hundred miles per hour corresponds to a minimum value of the pitch of the dynamic haptic effect (e.g., a value of zero).

Returning to FIG. 2, the method 200 continues at step 208 when the input parameter is mapped to the haptic parameter using a mapping algorithm. For example, the processor 102 can map an input parameter (e.g., the input parameter obtained in step 204) to a haptic parameter (e.g., the haptic parameter obtained in step 206) using a mapping algorithm.

For example, a parameter mapping module 142 can cause the processor 102 to apply one or more mapping algorithms to a received input parameter and haptic parameter to map the input parameter to the haptic parameter (e.g., determine an association or relationship between the input parameter and the haptic parameter). In some instances, the processor 102 can apply a mapping algorithm to an input parameter and a haptic parameter to define or determine how a haptic parameter can be modulated based on the input parameter. In some instances, the processor 102 can apply a mapping algorithm to any input parameter and any haptic parameter individual or in combination to map various input parameters to various haptic parameters.

In some embodiments, the processor 102 can apply one or more mapping algorithms such as, for example, a linear model, an exponential model, a logarithmic model, a custom model (e.g., a model obtained by the processor 102 via user input, from a database, or other device), or any other suitable model, to an input parameter and a haptic parameter to map the input parameter to the haptic parameter.

For instance, and with reference to FIG. 3, the processor 102 can apply a mapping algorithm to the velocity of the virtual vehicle and a strength of a dynamic haptic effect to map the velocity to the strength. In this example, the processor 102 can also apply a mapping algorithm to the velocity of the vehicle and the pitch of the dynamic haptic effect to map the velocity to the pitch. In this example, the processor 102 can determine an individual mapping between the velocity and the strength of the dynamic haptic effect and another mapping between the velocity and the pitch of the dynamic haptic effect.

In some instances, the processor 102 can generate and output a mapping curve that indicates a mapping of one or more input parameters to one or more haptic parameters. For instance, in the example depicted in FIG. 3, the processor 102 can generate a mapping curve 302 that indicates the mapping of the velocity to the strength of the dynamic haptic effect and a mapping curve 304 that indicates the mapping of the velocity to the pitch of the dynamic haptic effect. In this example, the processor 102 can apply a linear model to the velocity values and the strength values to map the velocity to the strength and the mapping curve 302 indicates the linear relationship or mapping between the velocity and the strength. The processor 102 can also apply a linear model to the velocity values and the pitch values to map the velocity to the pitch and the mapping curve 302 indicates the linear relationship or mapping between the velocity and the pitch.

In this example, the processor 102 can determine that the values for the velocity and the strength have a mapping or relationship such that a strength of the dynamic haptic effect increases linearly as a value of the velocity increases. The processor 102 can also determine that the values for the velocity and the pitch have a mapping or relationship such that a pitch of the dynamic haptic effect decreases linearly as a value of the velocity increases.

While in the examples described above, the processor 102 applies the same mapping algorithm to map the velocity to the strength and to map the velocity to the pitch, the present disclosure is not limited to such configurations. Rather, in other examples, the processor 102 can apply the same or different mapping algorithms to any combination of input parameters and haptic parameters. As an example, the processor 102 can apply a linear model to the velocity and strength values to map the velocity to the strength and apply an exponential model to the velocity and pitch values to map the velocity to the pitch.

Returning to FIG. 2, in some examples, in step 208, the processor 102 can map one or more subsets of values within a received range of values for an input parameter to a haptic parameter using one or more mapping algorithms.

Figure 4:
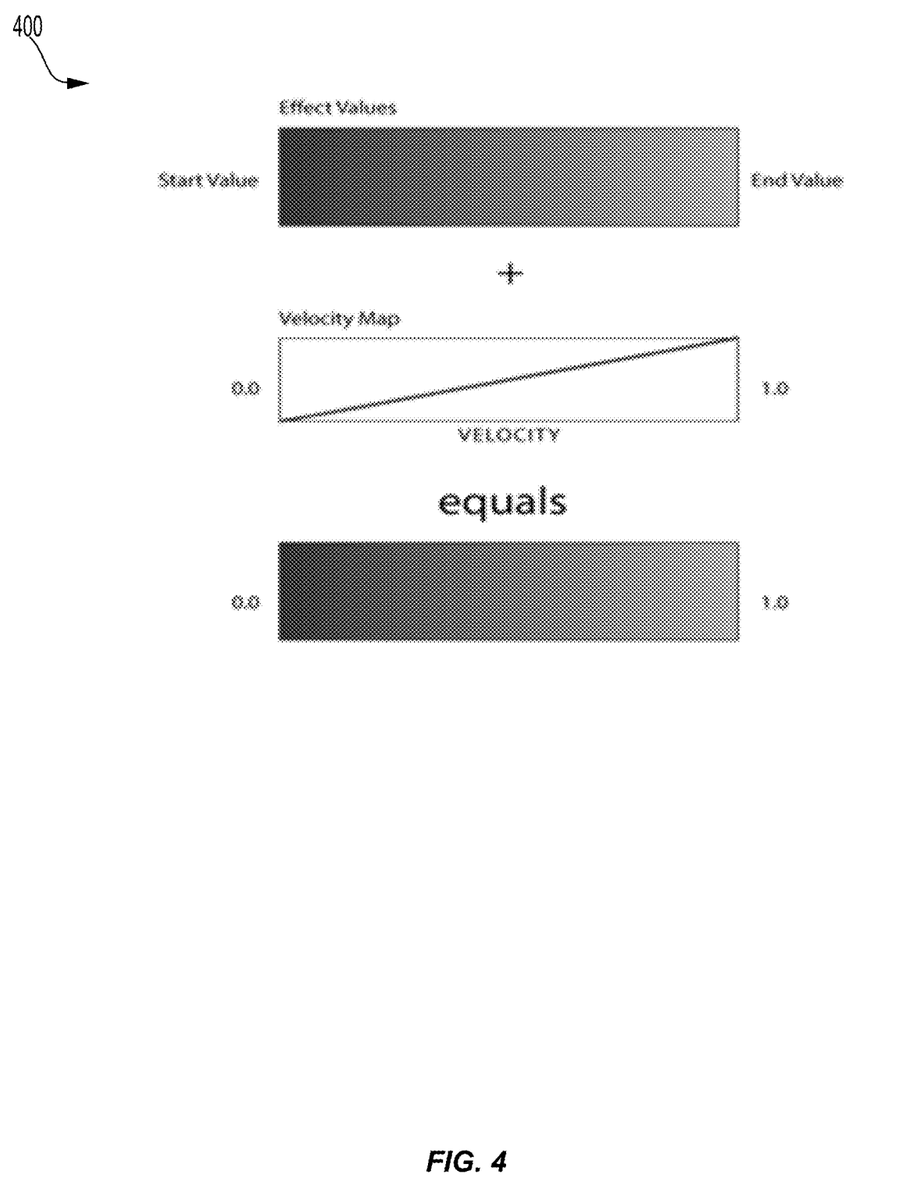
FIG. 4 is an example of an interactive user interface that can be generated for designing cross-platform dynamic haptics for augmented or virtual reality environments according to another embodiment.

For example, and with reference to FIG. 4, in step 208, the processor 102 can map a velocity of a virtual object to a haptic parameter using a linear model and generate an interactive user interface 400 that depicts the linear mapping of the velocity to the haptic parameter.

Figure 5A:
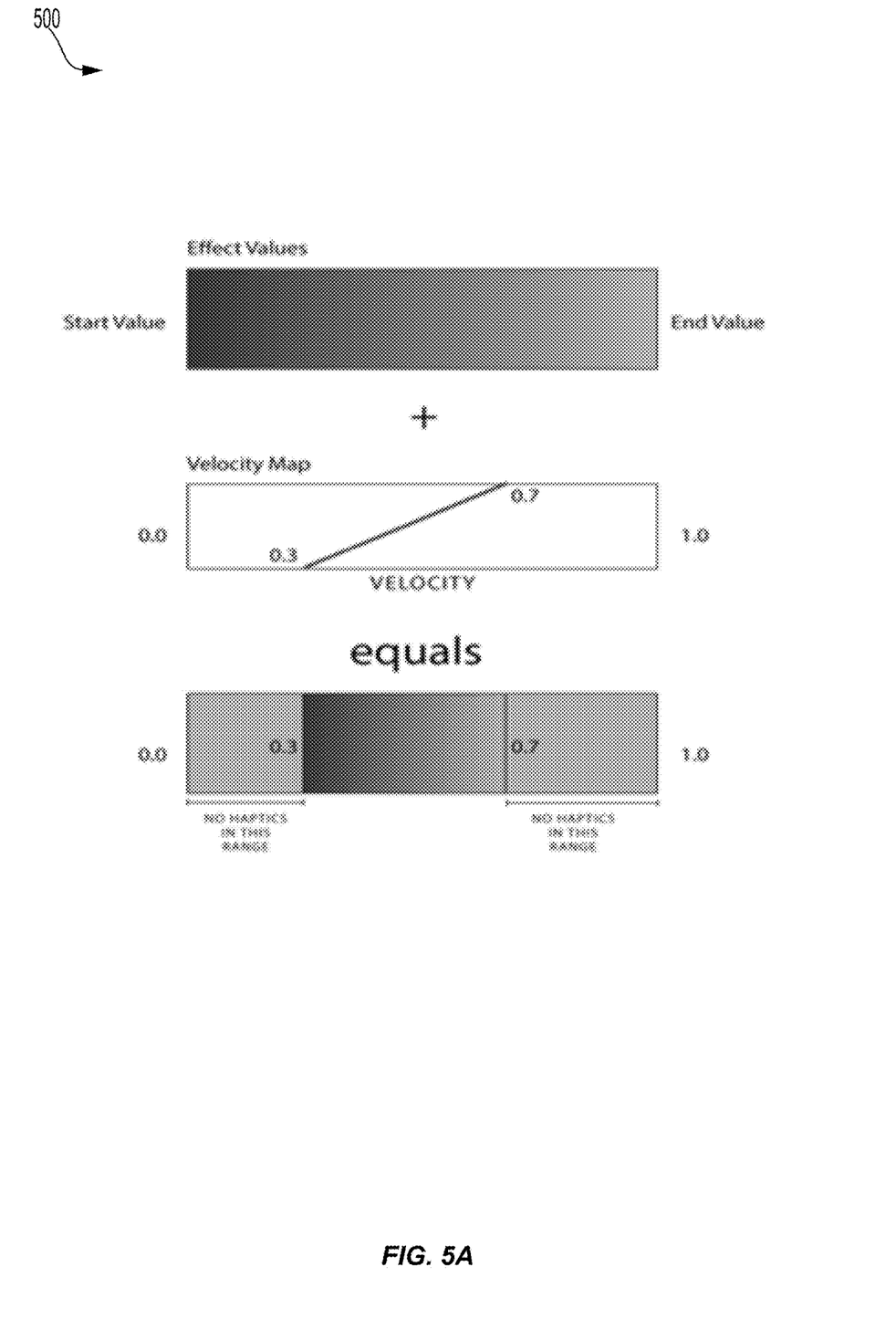
FIGS. 5A-B are examples of an interactive user interface that can be generated for designing cross-platform dynamic haptics for augmented or virtual reality environments according to another embodiment.

In another example, and with reference to FIG. 5A, in step 208, the processor 102 can map various subsets of values within a received range of values for a velocity of a virtual object (or other input parameter) to a haptic parameter using one or more mapping algorithms.

For instance, in this example, the processor 102 can receive data indicating that a range of values for a velocity of a virtual object in the simulated reality environment is between zero miles per hour and one mile per hour. The processor 102 can receive data indicating that a first subset of velocity values of the virtual object is between 0.3 miles per hour and 0.7 miles per hour and corresponds to a haptic parameter range that is between zero percent and one-hundred percent of a maximum value of a haptic parameter of a dynamic effect. In this example, the processor 102 can map the velocity of the virtual object to the haptic parameter using a linear model and generate an interactive user interface 500 that depicts the linear mapping of the velocity to the haptic parameter. In the example depicted in FIG. 5, the processor 102 can determine, based on the mapping, that no haptic parameter value corresponds to the velocity ranges between 0 miles per hour and 0.3 miles per hour and between 0.7 miles per hour and one mile per hour.

Figure 5B:
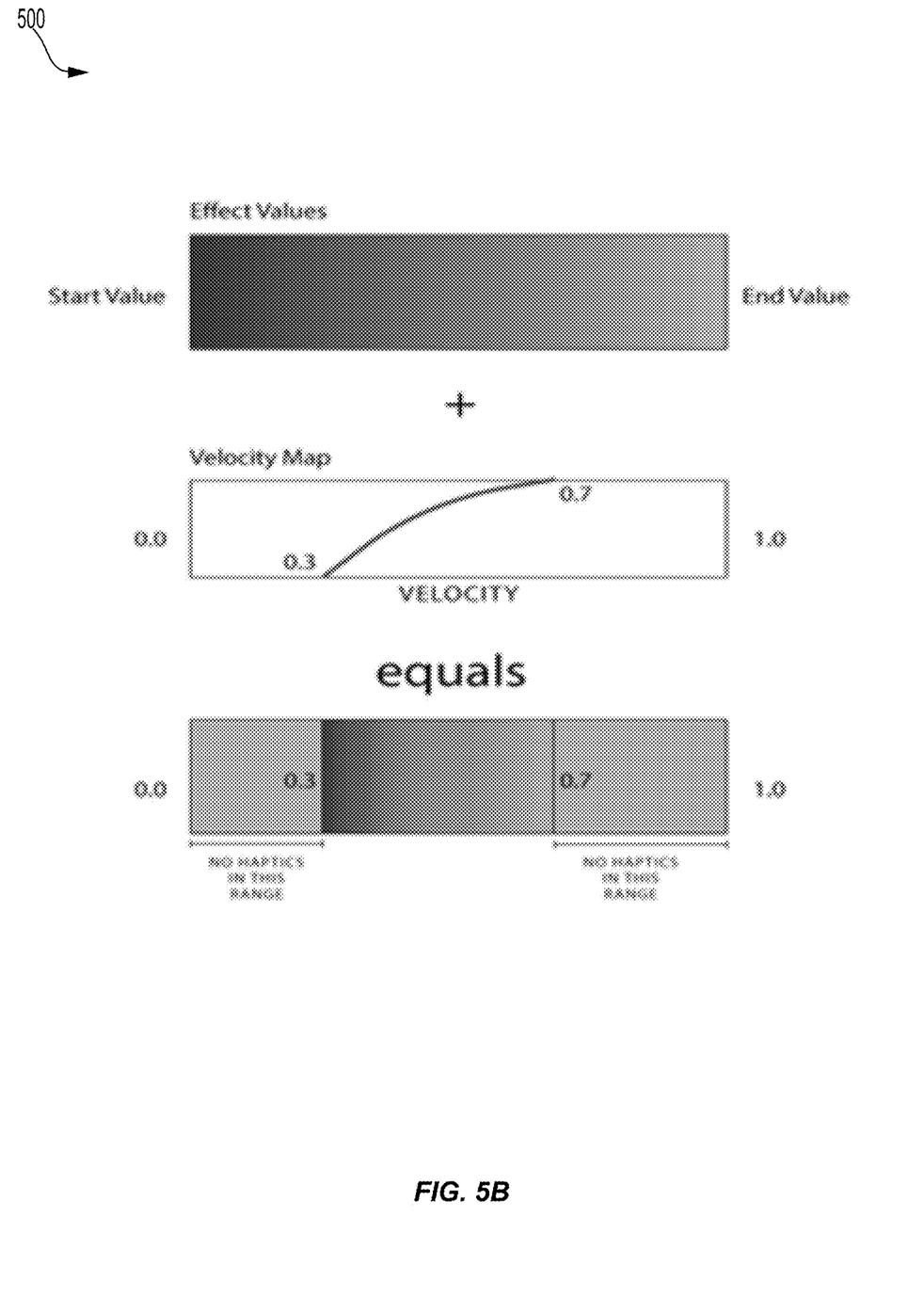

In the example depicted in FIG. 5B, the processor can apply another mapping algorithm to map the first subset range of velocities of the virtual object to the haptic parameter range using another model including, for example, an exponential model.

Returning to FIG. 2, the method 200 continues at step 210 when a dynamic effect is designed based at least in part on mapping the input parameter to the haptic parameter. In some embodiments, the processor 102 can design or generate the dynamic haptic effect.

For example, the parameter mapping module 142 can cause the processor 102 to automatically design one or more dynamic haptic effects.

For instance, the processor can design one or more dynamic haptic effects by interpolating various values of an input parameter (e.g., the velocity of the virtual object) and corresponding values of a haptic parameter and mapping a relationship between the various input parameter values and corresponding haptic parameter values for dynamic haptic effects.

The method 200 continues at step 212 when a plurality of dynamic haptic effects for a plurality of user devices are generated based at least in part on the designed dynamic haptic effect (e.g., a dynamic haptic effect designed by the processor 102 in step 210). In some embodiments, the processor 102 generates the plurality of dynamic haptic effects for the plurality of user devices based at least in part on the designed dynamic haptic effect.

For example, the cross-platform module 146 can cause the processor 102 to analyze a designed dynamic haptic effect (e.g., haptic parameters of a dynamic haptic effect designed using the parameter mapping module 142 in step 210) and generate one or more additional dynamic haptic effects that can be similar to the designed dynamic haptic effect and suitable for various devices or platforms.

For instance, the processor 102 can receive or obtain data (e.g., via user input or from another device) indicating that a designed dynamic haptic effect (e.g., a dynamic haptic effect generated by the processor 102 executing instructions included in the parameter mapping module 142) is intended for (e.g., suitable for) a particular user device or haptic output device. In this example, the cross-platform module 146 can include instructions that, when executed by the processor 102, cause the processor 102 to automatically convert the designed dynamic haptic effect to generate one or more dynamic haptic effects that can be similar to the designed dynamic haptic effect and suitable for various other user devices, haptic output devices, or platforms.

As an example, the processor 102 can receive data indicating that a designed dynamic haptic effect is suitable for a user device that includes a high definition haptic output device that supports a wide range of frequency values. In this example, In this example, the cross-platform module 146 can include instructions that, when executed by the processor 102, cause the processor 102 to convert the designed dynamic haptic effect (e.g., by modifying one or more frequency values mapped to an input parameter) to generate one or more similar dynamic haptic effects that can be suitable for various user devices that include haptic output devices that support a narrower range of frequency values (e.g., a linear resonant actuator or a spinning or scalable rotary actuator).

Figure 6:
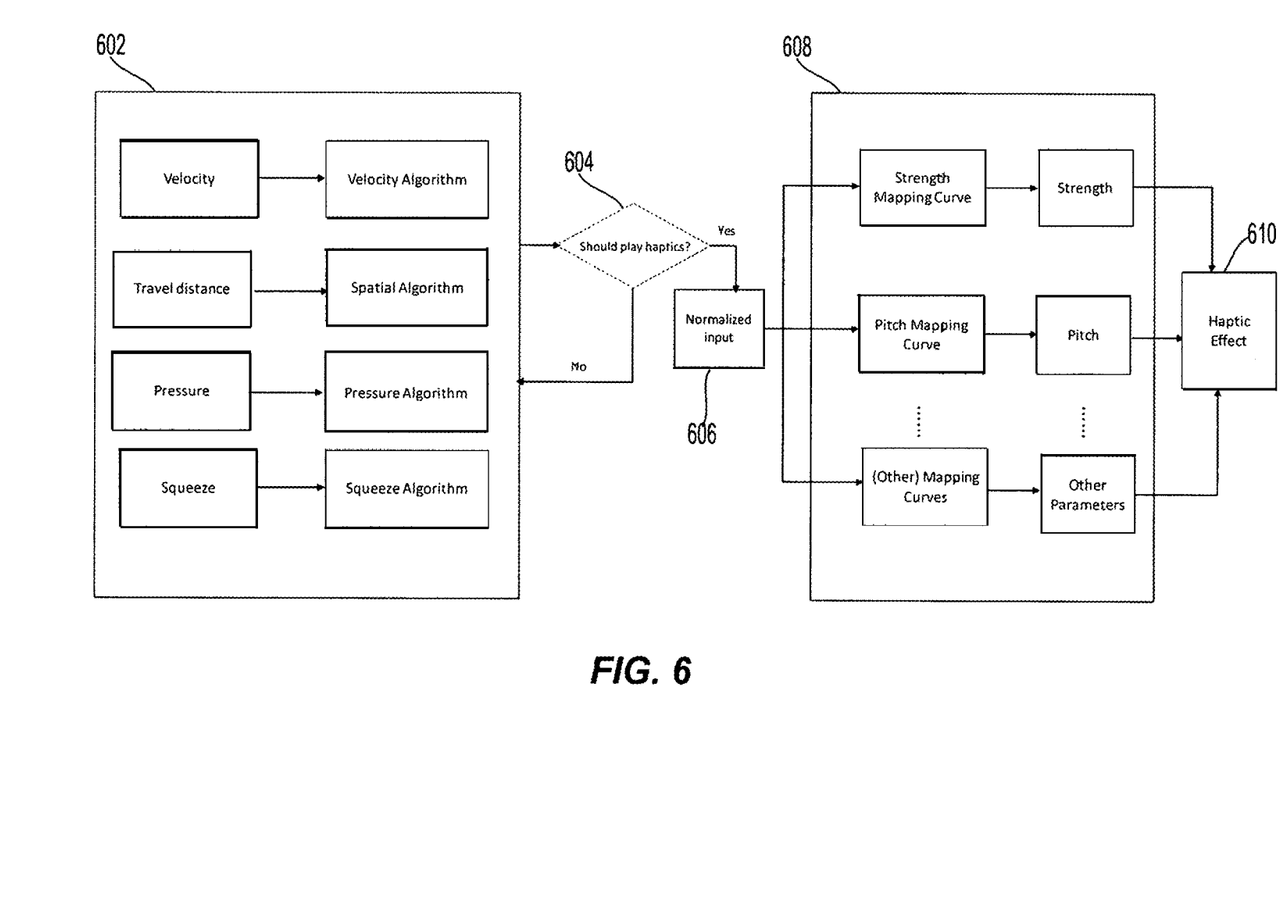
FIG. 6 is a flow chart of steps for performing a method for designing cross-platform dynamic haptics for augmented or virtual reality environments according to one embodiment.

FIG. 6 is a flow chart of steps for performing a method 600 for designing cross-platform dynamic haptics for augmented or virtual reality environments according to one embodiment. In some embodiments, the steps in FIG. 6 may be implemented in program code that is executable by a processor, for example, the processor in a general purpose computer, a mobile device, or a server. In some embodiments, these steps may be implemented by a group of processors. In some embodiments, one or more steps shown in FIG. 6 may be omitted or performed in a different order. Similarly, in some embodiments, additional steps not shown in FIG. 6 may also be performed. For illustrative purposes, the steps of the method 600 are described below with reference to components described above with regard to the system shown in FIG. 1, but other implementations are possible.

The method 600 begins at step 602 when data indicating an input parameter associated with a simulated reality environment or user interaction with the simulated reality environment is obtained via an interactive user interface.

In some embodiments, a processor 102 of a computing device can generate an interactive user interface via which the processor 102 can receive data (e.g., via user input) indicating one or more input parameters associated with a simulated reality environment or a user's interaction with the simulated reality environment. In the example depicted in FIG. 6, the input parameters can include, but are not limited to, a velocity of a virtual object in the simulated reality environment, a travel distance of the virtual object, an amount of pressure of a user's contact with the virtual object, a user's squeeze of the virtual object, etc.

In some embodiments, in step 602, the processor 102 can apply one or more algorithms to a received input parameter. In some examples, the processor 102 can determine an algorithm to apply to the received input parameter based on a type or characteristic of the parameter. For instance, in the example depicted in FIG. 6, the processor 102 can apply a velocity algorithm to an input parameter that is a velocity of a virtual object in the simulated reality environment. In some examples, the processor 102 can apply a spatial algorithm to an input parameter that is a travel distance of a virtual object. In another example, the processor 102 can apply a pressure algorithm to an input parameter that is an amount of pressure of a user's contact with the virtual object. In still another example, the processor 102 can apply a squeeze algorithm to an input parameter that corresponds to a user's squeeze of the virtual object.

In some examples, in step 602, the processor 102 can apply a particular algorithm to a received input parameter to determine whether a dynamic haptic effect associated with the input parameter should be played or generated.

For instance, the method 600 continues at step 604 when the processor 102 determines, based on the particular algorithm applied to the received input parameter, whether a dynamic haptic effect associated with the input parameter should be played or generated.

If the processor 102 determines at step 604 that a dynamic haptic effect associated with the received input parameter should not be played or generated, then the method 600 returns to step 602 and the processor 102 can receive one or more additional input parameters and determine, at step 604, whether a dynamic haptic effect associated with the input parameter should be played or generated.

If, the processor 102 determines at step 604 that a dynamic haptic effect associated with the received input parameter should be played or generated, then the method 600 continues to step 606 when the processor 102 normalizes the received input parameter.

The method 600 continues at step 608 when the processor 102 maps the input parameter to a haptic parameter (e.g., in step 208 of FIG. 2). For example, the processor 102 can map an input parameter to a haptic parameter using a mapping algorithm. In some examples, a haptic parameter can be any characteristic of a dynamic haptic effect that can be designed by the processor 102. For instance, in the example depicted in FIG. 6, a haptic parameter can include a strength (e.g., magnitude), a pitch (e.g., a tonality or other sound characteristic that can be based on frequency), or any other haptic parameter of the dynamic haptic effect (e.g., a duration, location, type, frequency, etc.)

For instance, in step 608, a parameter mapping module 142 can cause the processor 102 to apply one or more mapping algorithms to a received input parameter and a haptic parameter to map the input parameter to the haptic parameter (e.g., determine an association or relationship between the input parameter and the haptic parameter). In some instances, the processor 102 can apply a mapping algorithm to an input parameter and a haptic parameter to define or determine how a haptic parameter can be modulated based on the input parameter. In some instances, the processor 102 can apply a mapping algorithm to any input parameter and any haptic parameter individual or in combination to map various input parameters to various haptic parameters.

In some embodiments, the processor 102 can apply one or more mapping algorithms such as, for example, a linear model, an exponential model, a logarithmic model, a custom model (e.g., a model obtained by the processor 102 via user input, from a database, or other device), or any other suitable model, to an input parameter and a haptic parameter to map the input parameter to the haptic parameter.

In the example depicted in FIG. 6, in step 608, the processor 102 can apply a mapping algorithm to any input parameter (e.g., a velocity of a virtual object in the simulated reality environment, a travel distance of the virtual object, an amount of pressure of a user's contact with the virtual object, or a user's squeeze of the virtual object) and any haptic parameter (e.g., a strength, pitch, etc. of a dynamic haptic effect) individually or in combination to map various input parameters to various haptic parameters.

As an example, in step 608, the processor 102 can apply a mapping algorithm to the velocity of a virtual object and a strength of a dynamic haptic effect to determine an association or relationship between the velocity of the virtual object and the strength of the dynamic haptic effect in substantially the same manner as described above. As another example, the processor 102 can apply a mapping algorithm to the travel distance of a virtual object and a pitch of a dynamic haptic effect to determine an association or relationship between the travel distance of the virtual object and the pitch of the dynamic haptic effect in substantially the same manner as described above.

The method 600 continues at step 610 when a dynamic effect is designed or generated based at least in part on mapping the input parameter to the haptic parameter (e.g., in step 608). In some embodiments, the processor 102 can design or generate the dynamic haptic effect.

For example, a parameter mapping module 142 can cause the processor 102 to automatically design or generate one or more dynamic haptic effects. For instance, the processor 102 can design or generate one or more dynamic haptic effects by interpolating various values of an input parameter (e.g., the velocity of the virtual object) and corresponding values of a haptic parameter (e.g., a strength of the haptic effect) and mapping a relationship between the various values of the input parameter and haptic parameter to design one or more dynamic haptic effects.

While in some examples described above, a processor 102 can map input parameters to haptic parameters based on user input indicating a mapping algorithm, the present disclosure is no limited to such configurations. Rather, in other examples, the processor 102 can determine or predict a mapping algorithm to apply to the input parameters and haptic parameters. As an example, the processor can determine a mapping algorithm by performing one or more curve fitting operations based on a received range of values of an input parameter and corresponding values of a haptic parameter.

GENERAL CONSIDERATIONS

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may comprise computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A computing device comprising:
   a processor and a non-transitory computer-readable medium communicatively coupled to the processor, wherein the processor is configured to execute processor-executable instructions stored in the non-transitory computer-readable medium to:
   receive a sensor signal from a sensor, the sensor being part of a user device and configured to capture information about a user;
   determine a motion of the user based on the sensor signal;
   determine an input parameter associated with the motion of the user, the input parameter comprising at least a first subset of values and a second subset of values;
   map, using a mapping technique, the first subset of values of the input parameter to a first subset of haptic parameters and the second subset of values of the input parameter to a second subset of haptic parameters;
   design a first haptic effect comprising the first subset of haptic parameters and a second haptic effect comprising the second subset of haptic parameters for at least one of a plurality of user devices;
   generate a first haptic signal associated with the first haptic effect and a second haptic signal associated with the second haptic effect; and
   transmit the first haptic signal and the second haptic signal to a haptic output device.

2. The computing device of claim 1, wherein the processor is further configured to execute processor-executable instructions stored in the non-transitory computer-readable medium to:
   design the first haptic effect based at least in part on mapping the first subset of values of the input parameter to the first subset of haptic parameters and the second haptic effect based at least in part on mapping the second subset of values of the input parameter to the second subset of haptic parameters, wherein at least one of the first haptic effect or the second haptic effect comprises a dynamic haptic effect; and
   generate a plurality of dynamic haptic effects for the at least one of the plurality of user devices based at least in part on at least one of the designed first haptic effect or the designed second haptic effect and a characteristic of the at least one of the plurality of user devices.

3. The computing device of claim 1, wherein the processor is further configured to execute processor-executable instructions stored in the non-transitory computer-readable medium to:
   map, using the mapping technique, a plurality of input parameters to a plurality of haptic parameters; and
   determine a haptic effect that comprises the plurality of haptic parameters.

4. The computing device of claim 1, wherein the first haptic effect and the second haptic effect are different.

5. The computing device of claim 1, wherein the first haptic effect and the second haptic effect each comprises a plurality of haptic effects.

6. The computing device of claim 5, wherein the plurality of haptic effects comprises a plurality of dynamic haptic effects that each vary based on the sensor signal.

7. The computing device of claim 1, wherein the first subset of haptic parameters and the second subset of haptic parameters comprises at least one of a magnitude, duration, location, type, pitch, or frequency of the first haptic effect and the second haptic effect.

8. A method comprising:
   receiving, by a processor, a sensor signal from a sensor, the sensor being part of a user device and configured to capture information about a user;
   determining, by the processor, a motion of the user based on the sensor signal;
   determining an input parameter associated with the motion of the user, the input parameter comprising at least a first subset of values and a second subset of values;
   mapping, by the processor and using a mapping technique, the first subset of values of the input parameter to a first subset of haptic parameters and the second subset of values of the input parameter to a second subset of haptic parameters;
   designing, by the processor, a first haptic effect comprising the first subset of haptic parameters and a second haptic effect comprising the second subset of haptic parameters for at least one of a plurality of user devices;
   generating, by the processor, a first haptic signal associated with the first haptic effect and a second haptic signal associated with the second haptic effect; and
   transmitting, by the processor, the first haptic signal and the second haptic signal to a haptic output device.

9. The method of claim 8, further comprising:
   designing, by the processor, the first haptic effect based at least in part on mapping the first subset of values of the input parameter to the first subset of haptic parameters and the second haptic effect based at least in part on mapping the second subset of values of the input parameter to the second subset of haptic parameters, wherein at least one of the first haptic effect or the second haptic effect comprises a dynamic haptic effect; and
   generating, by the processor, a plurality of dynamic haptic effects for the at least one of the plurality of user devices based at least in part on at least one of the designed first haptic effect or the designed second haptic effect and a characteristic of the at least one of the plurality of user devices.

10. The method of claim 8, further comprising:
    mapping, by the processor, using the mapping technique, a plurality of input parameters to a plurality of haptic parameters; and
    determining, by the processor, a haptic effect that comprises the plurality of haptic parameters.

11. The method of claim 8, wherein the first haptic effect and the second haptic effect are different.

12. The method of claim 8, wherein the first haptic effect and the second haptic effect each comprises a plurality of haptic effects.

13. The method of claim 12, wherein the plurality of haptic effects comprises a plurality of dynamic haptic effects that each vary based on the sensor signal.

14. The method of claim 8, wherein the first subset of haptic parameters and the second subset of haptic parameters comprises at least one of a magnitude, duration, location, type, pitch, or frequency of the first haptic effect and the second haptic effect.

15. A non-transitory computer-readable medium comprising processor-executable program code configured to cause a processor to:
receive a sensor signal from a sensor, the sensor being part of a user device and configured to capture information about a user;
determine a motion of the user based on the sensor signal;
determine an input parameter associated with the motion of the user, the input parameter comprising at least a first subset of values and a second subset of values;
map, using a mapping technique, the first subset of values of the input parameter to a first subset of haptic parameters and the second subset of values of the input parameter to a second subset of haptic parameters;
design a first haptic effect comprising the first subset of haptic parameters and a second haptic effect comprising the second subset of haptic parameters for at least one of a plurality of user devices;
generate a first haptic signal associated with the first haptic effect and a second haptic signal associated with the second haptic effect; and
transmit the first haptic signal and the second haptic signal a haptic output device.

16. The non-transitory computer-readable medium of claim 15, further comprising program code configured to cause a processor to:
design the first haptic effect based at least in part on mapping the first subset of values of the input parameter to the first subset of haptic parameters and the second haptic effect based at least in part on mapping the second subset of values of the input parameter to the second subset of haptic parameters, wherein at least one of the first haptic effect or the second haptic effect comprises a dynamic haptic effect; and
generate a plurality of dynamic haptic effects for the at least one of the plurality of user devices based at least in part on at least one of the designed first haptic effect or the designed second haptic effect and a characteristic of the at least one of the plurality of user devices.

17. The non-transitory computer-readable medium of claim 15, further comprising program code configured to cause a processor to:
map, using the mapping technique, a plurality of input parameters to a plurality of haptic parameters; and
determine a haptic effect that comprises the plurality of haptic parameters.

18. The non-transitory computer-readable medium of claim 15, wherein the first haptic effect and the second haptic effect are different.

19. The non-transitory computer-readable medium of claim 15, wherein the first haptic effect and the second haptic effect each comprises a plurality of haptic effects.

20. The non-transitory computer-readable medium of claim 15, wherein the first subset of haptic parameters and the second subset of haptic parameters comprises at least one of a magnitude, duration, location, type, pitch, or frequency of the first haptic effect and the second haptic effect.

* * * * *